UNITED STATES PATENT OFFICE.

FREDERICK WALTON, OF LINOLEUM WORKS, STAINES, ENGLAND.

IMPROVEMENT IN THE MANUFACTURE OF FLOOR-CLOTHS AND SIMILAR FABRICS.

Specification forming part of Letters Patent No. 87,227, dated February 23, 1869; reissue No. 5,882, dated May 19, 1874; application filed May 9, 1874.

*To all whom it may concern:*

Be it known that I, FREDERICK WALTON, of the Linoleum Works, Staines, in the county of Middlesex, England, a subject of the Queen of Great Britain, have invented or discovered new and useful Improvements in the Manufacture of Floor-Cloths and Coverings, and Similar Fabrics, and in Pavements; and I, the said FREDERICK WALTON, do hereby declare the nature of the said invention, and in what manner the same is to be performed, to be particularly described and ascertained in and by the following statement thereof—that is to say—

This invention consists of a new manufacture of floor-cloths, coverings, pavements, and similar fabrics, made of a new composition of oxidized oil and rosin, or other material, which forms a compound with oxidized oil that is plastic while hot, and of these materials, combined with ground cork, sawdust, or similar vegetable material, with or without india-rubber, kaurie gum, or similar more or less elastic materials.

The following is a suitable composition for floor-cloths: Four hundred-weight of oxidized oil; one and a half hundred-weight of rosin; one-half hundred-weight kaurie gum.

The oxidized oil above mentioned is the gummy or resin-like material described in the American patent granted to me November 12, 1861, No. 33,722. Pine resin, or rosin as it is commonly called, melts at a comparatively low temperature, and combines with the said material to form a compound or composition of matter which is plastic when heated, and becomes practically non-plastic at the ordinary atmospheric temperatures. The plasticity of the compound when hot may be increased, if desired, by increasing the proportion of rosin, and vice versa. The operation of the kaurie gum, when compounded with oxidized oil and rosin, is to render the compound tough, and to reduce the tendency to crack which exists when rosin alone is combined with the oxidized oil. The proportions in which the materials are compounded may be varied as found expedient. Any color, in powder, may be added, Venetian red and ocher being mostly used.

The materials above mentioned are mixed together in a steam-heated pan, and the composition or cement thereby formed is, in the first place, cast into cakes. Afterward it is combined with an equal weight of ground cork in a mixing-machine. Sawdust may be used in place of ground cork, but the latter is preferable on account of its elasticity. When sawdust is used the quantity employed may be the same in bulk as that of the ground cork above mentioned.

The mixing-machine, by which the cement and the ground cork are mixed together, may consist of two rollers, one running quicker than the other, and the cakes of cement are, before being submitted to its action, heated, by being placed on steam-plates; or, a machine of the following construction may be employed: The softened cakes of cement are put in a cylindrical steam-heated casing, fitted with a coarse screw, which forces the cement through an aperture in the bottom of the casing, fitted with a movable slide, so that the quantity of cement delivered per minute may be regulated as required. Below this cylinder is fixed another steam-heated cylinder, containing a central shaft, having radial arms fitted in such manner as to form a screw, and between such arms are fitted, on the side of the cylinder, other arms, to mix the materials, and also to cause the mixed material to travel forward and be delivered at the bottom of the cylinder. The ground cork and cement are admitted, and in the proportions desired, at the same end of the cylinder. The ground cork is fed in by means of a pair of rollers, which deliver more or less in proportion, as they are set closer or farther apart.

When employing sawdust in place of cork, I prefer, if light colors are desired, to bleach it before it is used. Short fiber, such as paper-pulp, may be similarly employed.

To produce a floor-cloth or a fabric with a pattern upon it, I take a composition such as above stated, either uncolored or colored, with a suitable pigment, and spread it on a back of woven fabric. For this purpose I take the above cork or wood sawdust composition, and break it into small pieces, like pease, in a bark-mill or similar machine. It is then spread evenly, by a gage or gages, on a traveling cloth or blanket, which passes through a steam-heated chamber, and delivers it, when softened, into the mouth of a pair of powerful rollers, which are heated by steam admitted to the interiors of them. These rollers press the composition, and roll it on a linen or jute fabric, which lies on the bottom roller. A steel doctor, held on by levers and weights, keeps the roller clean, and a woolen pad, tightly screwed down and supplied with oil, lubricates it, and prevents adhesion of the material rolled. As the fabric leaves the rollers the composition which overlaps the edge is cut off. For this purpose the fabric is caused to pass over a bar, with two blades fixed in it at a distance apart equal to the width of the fabric. The bar is able to slide endwise in guides, so as to accommodate itself to the run of the fabric, and the blades are inclined at a considerable angle, so that they may cut freely and clearly.

If the fabric is to be inlaid with a pattern of a different color, I pass the fabric between rollers, conveniently of gun-metal or cast-iron, one of which has the pattern in relief cut upon it, and thus press down the composition at the parts where it is desired that a color should appear differing from that of the composition spread on the fabric; or the same end may be attained, and perhaps more conveniently, by flat pressure, a pattern-plate being employed and pressed down on the fabric by hydraulic or other pressure. I then take a second fabric, and spread thereon composition, colored according to the second color of the pattern, and with rollers or otherwise, as before, I press down the composition at the parts where a different color is required to that of the composition spread on—that is to say, the second embossing-roller is raised exactly in the parts in which the first roller is depressed or cut away, and vice versa. The projections on the pattern-surface should be a good deal tapered, so that they may draw out of the composition with facility, and so that the two pressed sheets may go together readily and accurately. The two coated and embossed fabrics thus produced I place face to face, so that the raised portions of the one enter the recesses in the other. The fabrics are made to adhere firmly, the one to the other, by pressing them together, the composition still being soft, or being rendered soft by passing the fabrics between steam pipes or chests, arranged so as to form a chamber. The pressure is best applied by squeezing the fabric between flat plates in a hydraulic press; lastly, by means of a splitting-machine, I cut the two woven fabrics or backs apart, leaving a portion of the composition on each.

The splitting-machine I employ for this purpose consists of an endless band of steel, sharpened at the edge. It is mounted on two pulleys—say, four feet in diameter—and padded with wash-leather, after the manner of Perin's saws. The bearings of one of the pulleys are fitted with a slide and screw for stretching the band. A pair of rollers carries the floor-cloth against the knife by an equable motion, and the floor-cloth is thus evenly split. The band runs at a high speed—say, ninety feet per second, and is steadied in brass guides.

A piece of Turkey stone balanced by weights and levers bears very slightly on the edge, and keeps it sharp, and pieces of doctor-steel placed before the sharpener on the edge remove any dirt. A little oil is applied to the blade by a fixed pad to lubricate it. In this manner a pattern-fabric is obtained which will wear down nearly to the back before the pattern is obliterated.

The above process is more particularly applicable when the two colors are distributed pretty equally over the fabric, but when one is greatly in preponderance a greater or less thickness of material should be allowed. If it be desired to obtain by inlaying more than two colors in the pattern, it may be done by repeating the operation for each additional color required. When it is desired to obtain an outline around the masses of the pattern, I spread a fabric with composition of the ground color, and over this, by a second spreading process, I put a thin layer of composition of the outlining color, and then emboss by rollers or otherwise, as in the former case. The fabric with the second color upon it is applied, and the two are cut apart, as before. It will be found that the act of embossing carries down the layer of the outlining composition into a vertical position around the edges of the pattern, so that when separating the two fabrics it is cut through and appears. The remainder of the outlining composition is buried and hidden.

In some cases I coat and emboss a fabric as before, and then fill in the recesses with composition of a different color in a soft state by a spreading operation, and scrape or doctor off the excess of the soft material. This process is applicable more particularly to fine lines. I prefer to proceed as follows: A metal plate or block, having fine raised lines on its surface, (this process being more especially applicable to the production of fine-line patterns,) is pressed in the material by hydraulic pressure, and after the sunken lines are produced composition the same as that already described, rendered soft by mixture with naphtha until of pasty consistence, is spread in the sunken lines by means of a steel doctor. It is then allowed to dry, and the surface cleaned off by pumice-stone and water, or the surface may be finished by taking off a thin shaving with a cutting-machine, such as before described; or the second composition may be simply spread or rolled in, and an upper back fabric applied, the two back fabrics being then cut apart as before. In this case the composition should contain less naphtha than is used in the former case, and a second fabric is run in between the composition and the rollers. Afterward the cutting operation is performed as before.

In order to produce the smaller parts of the design where the larger parts of the pattern have been already produced, by preference, by one or other of the methods hereinbefore described, I indent into the composition of the fabric the design to be added, and fill in the recesses with small pieces of suitable colored composition cut to the shapes required, and consolidate the whole by pressure. The indentation is best effected by means of a plate with a raised pattern upon it forced onto the fabric by hydraulic pressure. To consolidate the fabric I prefer to employ hydraulic pressure and perfectly flat plates, which are steam-heated during the operation.

In some cases I fill in the recesses with powder made by grinding composition of a suitable color, and consolidate the fabric by heat and pressure. The powder is made by grinding the composition in a fine bark-mill. The recesses are filled by a gage and rollers, one following the other on a flat surface on which the fabric is laid. The whole is passed through a steam-chamber before being drawn into the hydraulic press for pressing and consolidating, as before.

Another method which I employ for producing similar pattern fabrics is, to take sheets of composition of various colors, produced by passing the composition between rollers, and to cut or punch out pieces from them in the form of the pattern. The pieces punched out of a sheet of one color are then introduced into the corresponding holes in a sheet of another color; or pieces of suitable shape, but otherwise produced, may be employed. A back fabric is now cemented on, and the whole consolidated by pressure. If desired, the back fabric may be omitted.

I proceed as follows: The punching is done by a perforating-machine, such as is used for metal, consisting of punches and dies arranged so as to punch, say, six feet wide, at one stroke, the fabric passing forward, to receive another punching, around rollers working at intervals. When the holes are all punched, corresponding pieces of another color are put in by hand labor; or a machine may be employed having two sets of punches. The first set makes the holes in the sheet of the material, while this travels on step by step; and the second set of punches, in descending, passes through fillets, or narrow bands of material differently colored, and then by continuing to move on, they carry the pieces cut out into the holes made in the sheet by the other set of punches, and there they leave them. The holes in the sheet being filled, a woven fabric, prepared as hereinafter mentioned, is, if desired, applied on each side or on one side of the sheet. The whole passes forward into a hydraulic press, where it is pressed, say, ten or twelve inches in width at each pressing. It moves forward at each operation, being drawn by rollers.

The cement I employ is the same material as the composition, without the cork or sawdust, and thinned with naphtha. This should be put on the cloth previously, and allowed to dry before the cloth is applied. If two back fabrics are applied, the compound fabric is split, as already described.

In order to produce a floor-cloth or fabric with a marbled pattern upon it, I reduce composition of several different colors into fragments of irregular shapes. This is conveniently done by a process of very coarse grinding, as already described. The fragments are then mixed together, and spread in an even layer between two cloths, and consolidated by passing between rollers or otherwise, by pressure, in the manner already set forth. I prefer to pass the two cloths having the particles gaged to an equal thickness between them, to a hydraulic press with flat plates. If rollers be used to apply the pressure, the particles fuse into one another to a greater or less extent. The two back fabrics may then be cut apart, or one or both of them may be stripped off, and the surface cut smooth by the cutting-machine, as desired.

A similar fabric may also be produced by pressing these variously-colored pieces into a circular block, and then cutting off sheets concentrically. The forming india-rubber into cylindrical blocks and cutting off sheets concentrically, is a process well understood. I proceed with the floor-cloth composition in a similar manner.

I would here remark that, in every case, it is not essential that the back fabric should remain attached to the composition. It may, if desired, be stripped off when the process of manufacture is complete, but (except for economy) I prefer to leave the back fabric attached.

In some cases, in order to obtain a marbled floor-cloth or covering, or similar fabric, I lay several sheets of composition, differently colored, one over the other, and roll them onto a mandrel, and then from the roll so obtained I obtain a sheet by spiral cutting. In making the roll I employ sheets of composition, which are very irregular in their thickness, or else I use sheets of regular thickness, and roll them upon an irregular mandrel. Without this a suitable variety of colors would not be obtained. The cut sheet may be cemented onto a back fabric, if desired. The following is the method I prefer: Sheets of various colors are rolled on an eccentric roller, or one having an irregular surface, and when sufficiently large, the roll is warmed, placed in a press, (a hydraulic press is preferred,) and pressed into a solid roll. The roll is then advanced by gradual movement against a knife, by a machine, such as is used for cutting india-rubber, and an endless sheet of marbled material is produced. A back fabric is cemented on in rollers with cement, as previously described.

In some cases, in order to give to floor-cloths and coverings and similar fabrics, the face of which is composed of a plastic or semi-plastic composition, an appearance resembling Brussels carpeting, I indent its surface with shallow grooves at short distances apart, and parallel the one to the other, or there may be two sets of grooves crossing each other. The pattern is produced by engraved embossing-rollers of gun-metal, which are used cold. Afterward, I print a pattern onto the surface so prepared, as heretofore practiced in printing floor-cloths. The grooves on the surfaces will be found to break up the masses of color sufficiently to give the effect desired.

In some cases, in order to give to floor-cloths and coverings and similar fabrics, the face of which is composed of a plastic or semi-plastic composition, an appearance resembling ordinary floor-cloths, I spread the composition upon the back of a woven fabric in the manner and by the means of a pair of powerful rollers and their appurtenances, as described in the preceding part of this specification, and thereby produce a sheet of fabric with a smooth surface. I then print or paint a pattern upon the smooth surface so prepared without previously embossing or indenting it, in the same manner as has heretofore been practised in producing patterns upon ordinary floor-cloths.

The several processes which I have described may be applied to produce slabs of composition suitable for use as pavement; and in making such slabs the use of back cloths may sometimes be dispensed with, when, if the composition were thin enough for floor-cloth, they would be necessary.

What I claim is—

1. The plastic compound of oxidized oil and rosin, substantially as before set forth.

2. The tough plastic compound of oxidized oil, rosin, and kaurie gum, substantially as before set forth.

3. The combination of oxidized oil and ground cork, substantially as before set forth.

4. The oxidized-oil pavement, substantially as before set forth, consisting of the compound of oxidized oil and plastic material, in the form of a sheet.

5. The floor-cloth, substantially as before set forth, consisting of a woven fabric, combined with a layer of the compound of oxidized oil and plastic material.

6. The floor-cloth, substantially as before set forth, consisting of a woven fabric, combined with the compound of the oxidized oil, plastic material, and ground cork.

Witness my hand this 6th day of April, A. D. 1874.

FREDERICK WALTON.

Witnesses:
W. L. BENNEM,
PHILLIPS ABBOTT.